United States Patent [19]
Binder

[11] 3,854,462
[45] Dec. 17, 1974

[54] MIXTURE PREPARATION INSTALLATION FOR A MULTI-CYLINDER INJECTION INTERNAL COMBUSTION ENGINE

[75] Inventor: Robert Binder, Schwieberdingen, Germany

[73] Assignee: Firma Dr.-Ing. h. c. F. Porsche KG, Stuttgart-Zuffenhausen, Germany

[22] Filed: Oct. 13, 1972

[21] Appl. No.: 297,228

[30] Foreign Application Priority Data
Oct. 14, 1971    Germany............................ 2151187

[52] U.S. Cl....................... 123/119 R, 123/139 AW
[51] Int. Cl.............................................. F02m 51/00
[58] Field of Search. 123/119 R, 139 AW, 140 MC, 123/198 E

[56] References Cited
UNITED STATES PATENTS

| | | | |
|---|---|---|---|
| 2,843,098 | 7/1958 | Dolza............................ | 123/119 R |
| 2,916,027 | 12/1959 | Chayne et al................... | 123/119 R |
| 3,355,863 | 12/1967 | Pittsley.......................... | 123/119 R |
| 3,628,515 | 12/1971 | Knapp et al..................... | 123/119 R |

*Primary Examiner*—Charles J. Myhre
*Assistant Examiner*—Cort Flint
*Attorney, Agent, or Firm*—Craig & Antonelli

[57] ABSTRACT

A mixture preparation installation for a multi-cylinder injection-type internal combustion engine which includes an air filter housing accommodating a filter insert; an injection installation operating with continuous fuel injection is coordinated to the air filter housing and includes a control housing accommodating a measuring device that controls the fuel metering as a function of the air quantity flowing through the suction system; the control housing of the injection installation, a valve connection provided with a throttle valve and the filter insert of the air filter housing are thereby arranged adjacent one another on the air filter housing.

13 Claims, 2 Drawing Figures

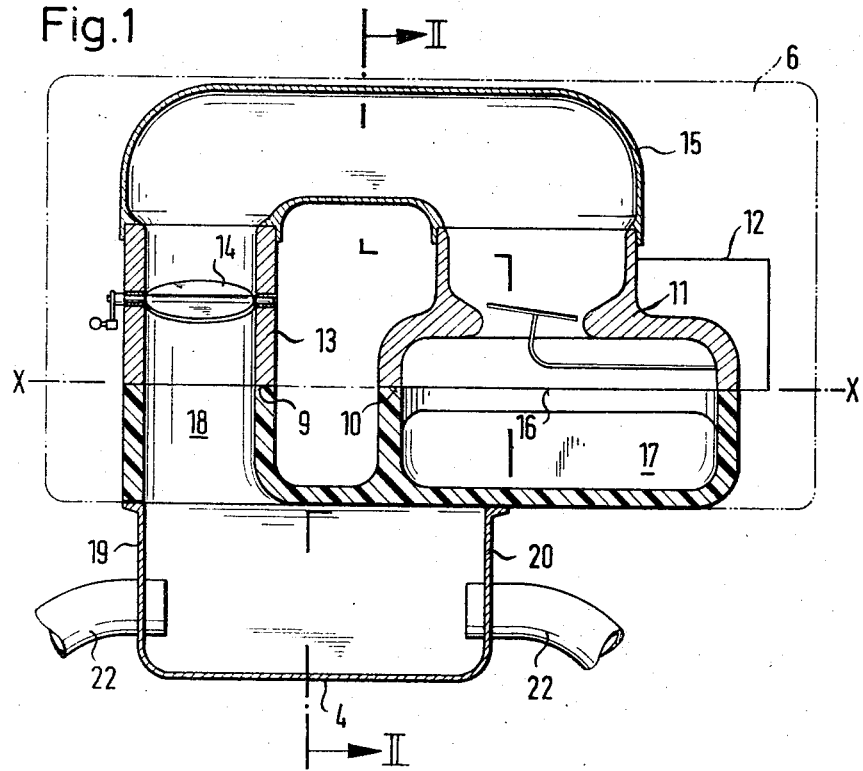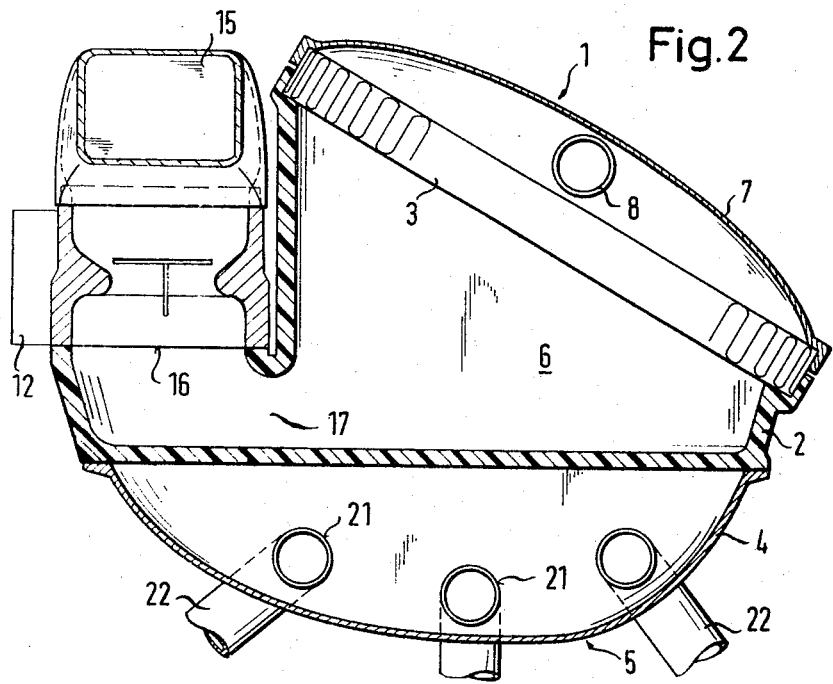

MIXTURE PREPARATION INSTALLATION FOR A MULTI-CYLINDER INJECTION INTERNAL COMBUSTION ENGINE

The present invention relates to a mixture preparation installation for a multi-cylinder injection internal combustion engine which includes an air filter housing receiving a filter insert, to which is coordinated an injection system operating with continuous injection which includes a control housing receiving a measuring element which controls the fuel metering action in dependence on the air quantity flowing through the suction system.

By means of a mixture preparation installation of the aforementioned type, the fuel quantity necessary for the operation of injection-type internal combustion engines is metered and admixed to the fresh air.

Such a mixture preparation installation is already known in the art in which the air filter is connected with an injection installation operating with a continuous injection. Thus, the German Offenlegungsschrift 2,002,444 discloses an installation in which the control housing of the injection installation controlling the fuel metering is held against an air filter housing and in which a suction pipe controlled by a throttle valve is arranged adjoining the control housing. However, disadvantageous in such prior art device is the fact that such an installation is structurally very high and requires a relatively large amount of space, whereby a subsequent installation into an already existing internal combustion engine becomes possible only with great difficulty. A further disadvantage resides in the fact that in case of an incorrect or improper exchange of the air filter insert, the measuring element of the control housing may be adjusted unintentionally or even damaged which leads to incorrect adjusting values of the fuel metering whereby the power output of the internal combustion engine is reduced.

The aim of the present invention resides in providing a mixture preparation installation for injection-internal combustion engines of the aforementioned type which avoids the aforementioned shortcomings and drawbacks, and which excels by a compact construction, a readily serviceable arrangement, and an easy accessibility as well as simple manufacture.

The underlying problems are solved according to the present invention in that the control housing of the injection installation, a valve connection provided with a throttle valve and the filter insert of the air filter housing are arranged adjacent one another on the air filter housing. Advantageously, the air filter housing is provided with sealing surfaces in a common plane on which abut the control housing and the valve connection. Appropriately, the air filter housing is mounted on an air distributor housing of the internal combustion engine and the air filter housing as well as the air distributor housing are constructed as plastic injection-molded parts. A further advantage resides in that the air filter housing is connected with the air distributor housing by gluing or similar adhesive means. Appropriately, the control housing and the valve connection are connected with each other by a detachable, short air connecting-pipe.

The advantages achieved with the present invention reside in that by the characterized features, a mixture preparation installation is obtained in which the air filter housing is so constructed that a favorable and space-saving as well as a compact arrangement of the injection installation, of the filter insert and of the throttle valve controlling the power output of the internal combustion engine results whereby each of the installations can be interchanged by itself and is readily accessible. Furthermore, a simple and cost-saving construction with low weight is made possible by the construction of the air filter housing of this invention and a streamlined shape favorable for the suction air is obtained.

These and other objects, features and advantages of the present invention will become more apparent from the following description when taken in connection with the accompanying drawing which shows, for purposes of illustration only, one embodiment in accordance with the present invention, and wherein:

FIG. 1 is a longitudinal cross-sectional view through a mixture preparation installation according to the present invention; and FIG. 2 is a cross-sectional view, taken along line II—II of FIG. 1.

Referring now to the drawing wherein like reference numerals are used throughout the two views to designate like parts, the mixture preparation installation generally designated by reference numeral 1 consists essentially of an air filter housing 2 made as plastic-molded part, for example, as injection-molded part using conventional synthetic resinous material, which includes a filter insert 3 and is secured on an air distributor housing 4 of the suction system generally designated by reference numeral 5 of an internal combustion engine (not shown). The air filter housing 2 includes a housing part 6 which serves for the accommodation of a filter insert 3 and is closed by a cover 7 that includes an air suction stub 8. Adjacent the housing part 6 the air filter housing 2 is provided with sealing surfaces 9 and 10 (FIG. 1) in a plane X—X which serve for the mounting of a control housing 11 of an injection installation 12 as well as of a valve connection pipe 13. The valve connection pipe 13 is provided with a throttle valve 14 whose position is adapted to be influenced by a gas pedal (not shown). The control housing 11 and the valve connection pipe 13 are connected with each other by way of an air connection pipe 15 in the form of a short pipe connection. The sealing surface 10 encloses a mouth 16 which is connected with the housing part 6 by way of a channel 17, and the sealing surface 9 encloses a suction channel 18 corresponding to the valve connection pipe 13, which terminates in the air distributor housing 4. The air distributor housing 4 is constructed pot-shaped whereby the side walls 19 and 20 thereof are provided with apertures 21, into which are inserted individual suction pipes 22 corresponding to the number of cylinders of the internal combustion engine.

OPERATION

The operation of the air filter installation is as follows:

If the internal combustion engine is operating, then during the suction stroke, fresh air is sucked into the suction system 5 through the air suction connecting stub 8. The fresh air is cleaned by the filter insert 3, reaches the housing part 6 and by way of the channel 17, the control housing 11. A measuring element of conventional type measuring the air quantity flowing through the control housing 11 is arranged in the latter, by means of which the required fuel quantity corresponding to this air quantity is determined and metered by way of a conventional metering valve (not shown); the thus metered fuel quantity is injected into the suction pipes 22 by way of the injection installation 12 by means of conventional injection valves (not shown). After flowing through the control housing 11, the sucked-in air is conducted by way of the air connection pipe 15 to the valve connection pipe 13 whose throttle valve 14 controls the air flow and therewith the power output of the internal combustion engine. Thereafter, the sucked-in air reaches the air distributor housing 4 by way of the suction channel 18, and from there by way of the suction pipes 22, the cylinders of the internal combustion engine. The compact construction of the air filter housing 2 makes possible a space-saving arrangement of the injection installation 12 together with the advantage of an easy accessibility to all devices such as filter insert 3, control housing 11 and valve connection pipe 13.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A mixture preparation installation for a multi-cylinder injection-type internal combustion engine having a suction system, said installation comprising: an air filter housing, a filter insert disposed in a portion of said air filter housing, a fuel injection means operating with continuous injection operatively connected with said air filter means including a control housing, measuring means disposed in said control housing for controlling the fuel metering action in dependence on the air quantity flowing through the suction system, connecting means for connecting said control housing with the suction system, a valve means including a throttle valve disposed in said connecting means for controlling the air flow therethrough, said connecting means, the portion of said filter housing in which said filter insert is disposed and said control housing being disposed adjacent one another, said air filter housing, said control housing and said connecting means being provided with sealing surfaces disposed substantially in a common plane, said control housing and said connecting means being disposed on the sealing surface of said air filter housing.

2. A mixture preparation installation according to claim 1, wherein the suction system includes an air distributor housing means for distributing the sucked-in air to the cylinders of the engine, said air filter housing being mounted on said air distributor housing means, said air filter housing and said air disbributor housing means being constructed as plastic molded parts.

3. A mixture preparation installation according to claim 2, wherein said air filter housing and said air distributor housing means are constructed as injection-molded parts made from synthetic resinous material.

4. A mixture preparation installation according to claim 2, wherein said air filter housing is adhesively connected with said air distributor housing means.

5. A mixture preparation installation according to claim 4, wherein said connecting means further includes a removable air pipe means for connecting said control housing with the suction system.

6. A mixture preparation installation according to claim 5, wherein said air filter housing and said air distributor housing means are constructed as injection molded parts made from synthetic resinous material.

7. A mixture preparation installation according to claim 6, wherein said air filter housing means and said air distributor housing means are constructed as injection-molded parts made from synthetic resinous material.

8. A mixture preparation installation according to claim 6, wherein said air filter housing means is adhesively connected with said air distributor housing means.

9. A mixture preparation installation according to claim 1, wherein the suction system includes an air distributor housing means for distributing the sucked-in air to the cylinders of the engine, said air filter housing including a suction channel disposed between said connecting means and said air distributor housing.

10. A mixture preparation installation according to claim 9, wherein said connecting means includes a first pipe means and a second pipe means, said first pipe means being disposed between said suction channel and said second pipe means, said second pipe means extending from said first pipe means to said control housing.

11. A mixture preparation installation according to claim 10, wherein said throttle valve means is disposed in said first pipe means.

12. A mixture preparation installation according to claim 11, wherein said second pipe means is substantially U-shaped.

13. A mixture preparation installation according to claim 12, wherein a channel means is provided for connecting the control housing with the portion of said air filter housing in which said filter insert is disposed.

* * * * *